United States Patent [19]

Winski

[11] Patent Number: 4,643,622
[45] Date of Patent: * Feb. 17, 1987

[54] AUTOMATIC C-AXIS FEEDRATE CONTROL FOR MACHINE TOOLS

[75] Inventor: Dennis A. Winski, Fairfield, Conn.

[73] Assignee: Moore Special Tool Co., Inc., Bridgeport, Conn.

[*] Notice: The portion of the term of this patent subsequent to Oct. 22, 2002 has been disclaimed.

[21] Appl. No.: 715,681

[22] Filed: Mar. 25, 1985

Related U.S. Application Data

[63] Continuation-in-part of Ser. No. 604,064, Apr. 26, 1984, Pat. No. 4,547,996.

[51] Int. Cl.$^4$ .............................................. B23C 1/06
[52] U.S. Cl. .................................... 409/84; 51/165.71; 318/571; 318/572; 318/569; 364/474; 409/80
[58] Field of Search ............... 51/165.71, 165 TP, 93, 51/97 NC, 101 R, 44, 237, 236; 409/80, 183, 33 R, 84; 125/11 A, 11 AT; 364/474, 475; 33/503, 504, 505, 556, 550; 318/570, 571, 572, 568, 569, 574

[56] References Cited

U.S. PATENT DOCUMENTS

| | | | |
|---|---|---|---|
| 3,123,657 | 3/1964 | Clark, Jr. et al. | 364/747 |
| 3,276,327 | 10/1966 | Arrowsmith et al. | 409/80 |
| 3,840,791 | 10/1974 | Mack | 318/571 |
| 3,942,287 | 3/1976 | Tokunaga et al. | 51/165 TP |
| 3,948,144 | 4/1976 | Nagano | 409/167 |
| 4,150,327 | 4/1979 | Camera et al. | 318/571 |
| 4,228,617 | 10/1980 | Bando | 51/165 TP |
| 4,455,755 | 6/1984 | Fritsche et al. | 33/504 |
| 4,547,996 | 10/1985 | Winski | 51/165.71 |

*Primary Examiner*—Frank T. Yost
*Assistant Examiner*—Hien H. Phan
*Attorney, Agent, or Firm*—Kramer and Brufsky

[57] ABSTRACT

A machine tool is provided with a controller for computing, as a function of an established radius and a preset feedrate, a rotational speed for rotating the machine spindle to provide a uniform surface speed at the working edge of a tool as the tool alternates between linear movement along an X and/or Y axis and arcuate movement along the C-axis of the spindle. A method is provided for gauging straight surfaces and adjoining arcs at a constant feedrate without interruption.

9 Claims, 6 Drawing Figures

AUTOMATIC C-AXIS FEEDRATE CONTROL FOR MACHINE TOOLS

This application is a continuation-in-part of my co-pending U.S. patent application Ser. No. 06/604,064 filed Apr. 26, 1984 and entitled "Jig Grinder With Automatic C-Axis Feedrate Control, now U.S. Pat. No. 4,547,996."

BACKGROUND OF THE INVENTION

The present invention relates to machine tools, and more particularly to such tools having automatic C-axis feedrate control to provide a constant feedrate as the tool progresses along straight and curved paths. Examples of such machine tools are measuring machines, aspheric generators, and jig grinders.

Jig grinders are used by machinists to accurately grind precision holes, radii, blends, and surfaces in metal or other materials. These machine tools are used in the manufacture of a wide variety of high precision products. For example, jig grinders are used by the automotive and aerospace industries for producing engine parts, gears, and the like. Although extreme precision is the primary goal of such applications, productivity is a main concern, particularly in keeping the cost of individual machine parts as reasonable as possible. Accordingly, recent advances in jig grinder design have concentrated on automating the grinding process in an effort to increase machine throughput while maintaining accuracy.

Various grinding techniques which can be accomplished with jig grinders are well known. One such technique is the use of "chop grinding". The chop grinding principle utilizes a rapid reciprocation of the grinding wheel in a direction along the wheel axis. It has been found that this technique grinds cool, providing more consistent surface finishes, geometry and size than other, more conventional grinding techniques.

Chop grinding can be used to machine holes and edges as well as radii. There are several different motions which occur simultaneously during a chop grinding process. One motion is that of the grinding wheel which rotates, typically at a high rate of speed. The grinding wheel, which is coupled to the spindle of the jig grinder, can be offset from the center axis of the spindle (along the machine's "U-axis") so that it will sweep an arc when the spindle is rotated. This motion is useful when grinding arc segments (i.e. curved surfaces) in a workpiece. Rotation of the spindle occurs along the "C-axis" of the jig grinder. As noted above, the grinding wheel will also be reciprocated up and down. Reciprocation of the grinding wheel occurs along the "Z'-axis" of the jig grinder. Further, the workpiece being machined is usually mounted to a worktable, which can be moved in straight paths described by the "X" and/or "Y" axes of the jig grinder.

In the past, jig grinders have been largely manually operated. In performing a chop grinding task, a machine operator would manually index the grinding wheel against the surface to be ground, and commence grinding with a rotating and reciprocating grinding wheel. As material was ground away from the surface of the workpiece, the machine operator would manually feed the grinding wheel toward the workpiece ("outfeed") until the required amount of material was ground off. Upon each outfeed operation, the grinding wheel would create a shower of sparks as it proceeded to strip material from the grinding surface. A machine operator would then wait until the sparks stopped, indicating that the grinding wheel had removed all of the stock up to the outfed position (or the grinding wheel had worn to a point where an outfeed adjustment was necessary). The operator would then manually repeat the cycle until the finished dimensions were reached.

Wipe grinding, which is a technique wherein the grinding wheel is not reciprocated, has also been done manually in the past. An operator would bring the grinding wheel to the surface to be ground, and manually index the grinding wheel toward the workpiece until the required amount of stock material had been removed. When wipe grinding, an operator would slowly and repetitively feed the grinding wheel toward the surface being ground.

Grinding arc segments in a workpiece has generally been somewhat of a trial and error process. One way machine operators grind arc segments is to overcut the desired arc by cutting a longer arc than needed, and then strip away the straight surfaces adjoining the arc along the X and Y axes until the required dimensions are achieved. Another way arcs are ground is by a process known as "contour grinding", in which the X, Y, and/or C axes are indexed simultaneously during grinding. This technique can lead to imprecise results due to the complex geometric relationships which must be controlled when indexing a plurality of axes concurrently. A third technique which has been used for arc grinding is to grind the required straight surfaces along the X and Y axes and then stop, each time an arc is to be ground, so that manual indexing of the C-axis and grinding of the arc can be achieved.

It would be advantageous to provide a jig grinder or other automated machine tool with the capability to travel along both straight and arcuate paths at a constant feedrate without interruption. By reducing the number of manual operations required of the machine operator, such an automated machine tool would increase machine productivity and improve the accuracy to which parts are machined or measured. The present invention relates to an automated machine tool in which these and other advantages are achieved.

SUMMARY OF THE INVENTION

In accordance with the present invention, a machine tool is provided which comprises a work or tool holding table for movement along one axis (e.g., linear X and/or Y axis). Movement of the table occurs at a preset feedrate, designated "Fr(p)", which is set by the machine operator. The machine tool further includes another axis about which a tool can be rotated (e.g., a "C-axis"). A tool holder is mounted to, for example, a spindle that rotates about the rotatable axis and has a receptacle for holding a tool, such as a measuring probe or a grinding or cutting tool. Means are provided for offsetting the tool from the center axis of the spindle to establish a radius (designated "r") from the spindle axis to the working edge of the tool. The "working edge" of the tool is generally the probe tip where the tool is a measuring probe and the cutting edge where the tool is a grinding or cutting wheel. Means are also provided for computing, as a function of the established radius "r" and said preset feedrate "Fr(p)", a rotational speed for the spindle which will provide a uniform surface speed at the tip of a measuring probe on the cutting edge of a grinding or cutting tool as the tool alternates between linear travel along the X or Y axis and arcuate travel along the C-axis. Finally, means are provided for rotating the spindle along the C-axis to traverse a preset arc at the computed rotational speed.

The rotational speed (designated "Fr(c)") at which the spindle must rotate in order to provide the desired uniform surface speed can be computed in accordance with the formula:

$$Fr(c) = \frac{180 \, Fr(p)}{\pi \, r}$$

A method for guiding a tool along straight surfaces and adjoining arcs at a constant feedrate without interruption is also provided in accordance with the present invention. The method comprises the steps of mounting a tool to a machine tool spindle and offsetting the tool from the center axis of the spindle to establish a radius "r" from the spindle axis to the working edge of the tool. A workpiece to be measured or machined is mounted adjacent the tool and the tool and workpiece are moved relative to one another at a preset feedrate "Fr(p)" along a straight path to effect measuring or machining along a straight path on the workpiece. A rotational speed for rotating the spindle to provide a uniform surface speed at the working edge of the tool, as the tool traverses the workpiece from a straight path to an arcuate path, is computed as a function of the established radius "r" and the preset feedrate "Fr(p)". The spindle is then rotated at the computed rotational speed as the tool traverses the arcuate path.

The method described above can comprise the further steps of stopping the relative movement along a straight path concurrently with the commencement of rotation of the spindle, and stopping the rotation of the spindle concurrently with the commencement of relative movement along a straight path.

DETAILED DESCRIPTION OF A PREFERRED EMBODIMENT

The present invention provides an improved, automated machine tool, such as a measuring machine, aspheric generator or jig grinder. Although the invention is primarily described herein as it applies to a jig grinder, the appended claims are not limited to jig grinders and the invention is intended to be covered in its broadest sense.

A specific feature provided by a jig grinder incorporating the present invention is the automatic control of pocket grinding to provide a constant feedrate, without interruption, when grinding straight surfaces and adjoining corners. This and other features and advantages of the invention will become apparent from the following detailed description of a preferred embodiment when considered in connection with the accompanying drawings.

Figure 1:
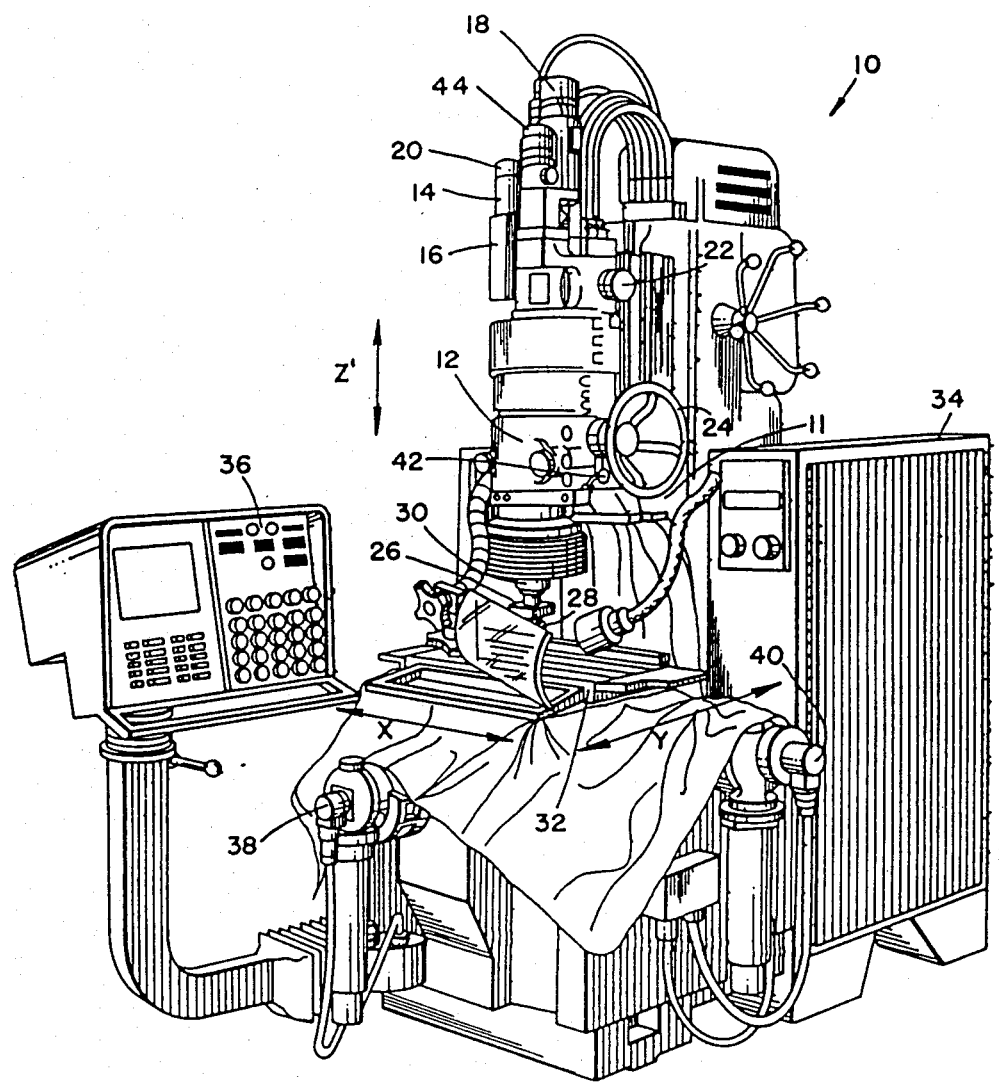
FIG. 1 is a perspective view of a jig grinder which illustrates the placement of various components thereon.

Turning now to FIG. 1, an overall view of a jig grinder 10 is shown. Jig grinders similar to that shown in FIG. 1 are manufactured by Moore Special Tool Co., Inc., the assignee of the present invention. Prior manually operated versions of such jig grinders are well known in the art. Jig grinder 10 includes a fixed housing 11 to which a grinding head 12 is slidingly mounted. Grinding head 12 is adapted to move up and down vertically, along the Z'- axis as designated by the vertical arrow shown in FIG. 1. Grinding head 12 carries a spindle 30 therewithin which is coupled to motor 18 for rotation. An encoder 44 tracks the angular position of spindle 30 as the spindle rotates between 0 and 360 degrees (rollover occurs at 359.99°). Spindle 30 has a tool holder 26 mounted thereto which carries a grinding tool 28 in a receptacle 23 (shown diagrammatically in FIG. 2). Typically, grinding tool 28 is an abrasive wheel. In an alternate embodiment, grinding tool 28 is replaced with a measuring probe 88 shown in FIG. 6, so that the jig grinder can be used as a measuring machine to measure, e.g., the dimensions of a workpiece which has been machined on the jig grinder.

Included in tool holder 26 is an offset mechanism which can be used to offset tool 28 from the longitudinal axis of spindle 30. The offset mechanism is controlled through a series of gears and links connected to a stepper motor 14. An encoder 20 is coupled to stepper motor 14 and provides an output indicative of the angular position of the stepper motor shaft. It is noted that a servo motor connected in a closed position loop arrangement could be used instead of a stepper motor. A separate encoder 16 mounted to housing 11 provides an output indicative of the vertical position of grinding head 12, and hence spindle 30 and tool 28, with respect to housing 11 along the Z' axis.

Housing 11 also carries a work holding table 32 which is adapted to be moved in the X and Y directions respectively by motors 38 and 40. An operator control panel 36 enables an operator to interface with the automatic machine controls. Cabinet 34 houses a numerical controller and associated computer equipment.

Movement of grinding head 12 with respect to housing 11 can be controlled manually by manipulating hand wheel 24, or automatically via the operator control panel 36. A manually adjustable orifice 22 is provided to enable an operator to control the speed at which grinding head 12 reciprocates in the automatic mode. An additional manually adjustable orifice (not shown) can be provided for fine control of the reciprocation speed. A hand lever 42 is provided to override all other controls and move grinding head 12 up under automatic control.

It is desirable, in grinding pockets, holes, or arc segments, to maintain a uniform surface speed at the cutting edge of the grinding wheel throughout the grinding process. In other words, the feedrate of the grinding tool with respect to the workpiece should be maintained constant as the tool progresses from a starting point to a finish point in the surface being ground. Examples of shapes which require arc segment grinding are shown in FIGS. 3 and 4.

Figure 2:
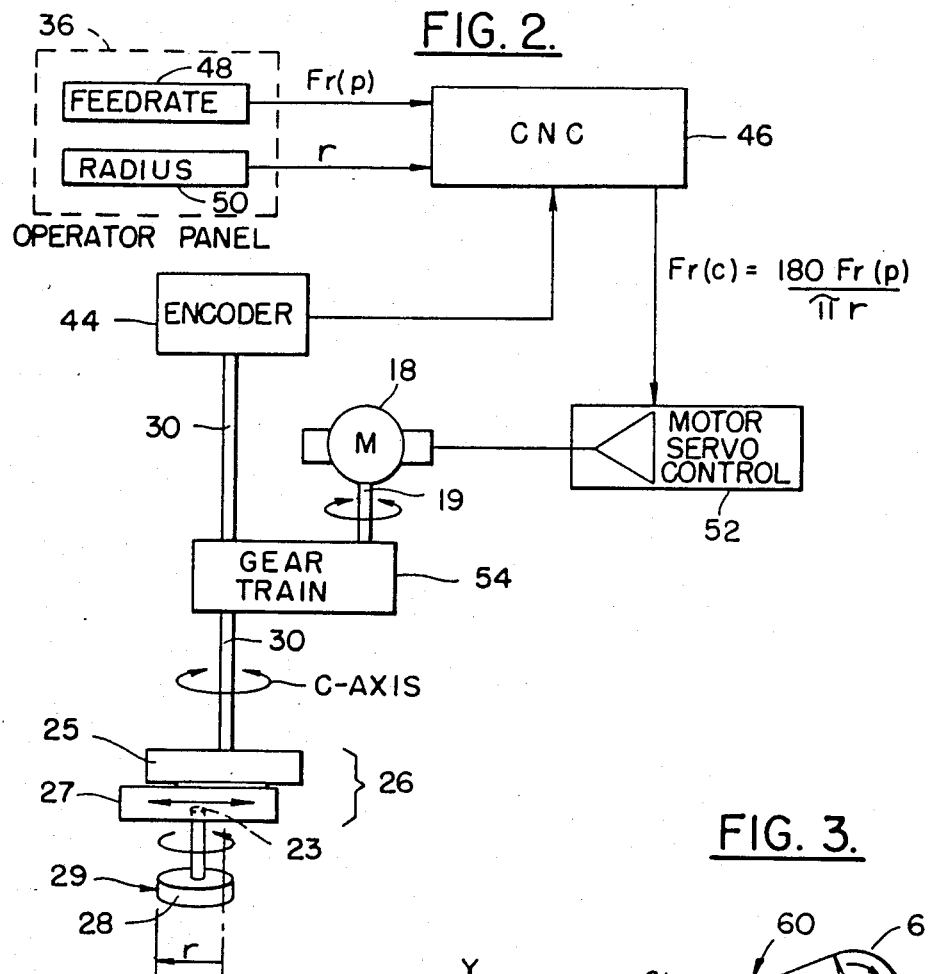
FIG. 2 is a block diagram of the electro-mechanical system for computing the rotational speed for the spindle and for rotating the spindle.
Figure 3:
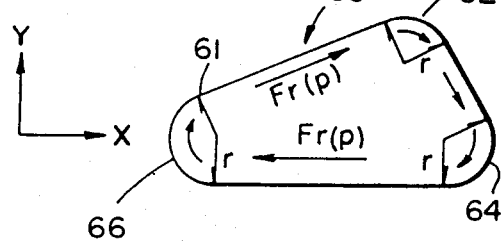
FIG. 3 is a sketch showing one example of a shape in which straight surfaces are ground with adjoining arc segments.
Figure 4:
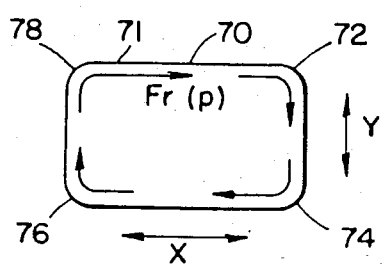
FIG. 4 is a sketch of another example of a shape including straight surfaces with adjoining arcs.

To grind the shape 60 shown in FIG. 3, a grinding wheel might be started at the point labeled 61. From this point, the work holding table 32 (shown in FIG. 1) to which the workpiece is mounted can be indexed in the X and Y directions so that the tool moves toward arc segment 62 along the straight path shown. The combined movement in the X and Y directions will occur at a preprogrammed feedrate Fr(p). In grinding arc segment 62, it will be desirable to maintain the feedrate "Fr(p)" as grinding takes place along the circumference of the arc. In order to accomplish this, a new feedrate for the rotation of spindle 30 about the C-axis must be computed. It has been found that this new feedrate, designated "Fr(c)", can be calculated as a function of the preset feedrate Fr(p) and the radius "r" defined by the distance from the center axis of spindle 30 to the edge 29 of the grinding wheel 28, as shown in FIG. 2. This relationship will be described in greater detail below.

Once the grinding wheel has traversed the circumference necessary in grinding arc segment 62 (FIG. 3), the operation will proceed from arc segment 62 toward arc segment 64 along the X and Y axes of work holding table 32 as shown. This is achieved by indexing work holding table 32 along its X and Y axes at the preset feedrate Fr(p). Movement of work holding table 32 as described will produce a straight, or linear surface between arc segments 62 and 64.

Once the workpiece has been advanced to the point where arc segment 64 is to be ground, spindle 30 will be rotated at the calculated feedrate Fr(c) so that the overall feedrate will be maintained constant. From arc segment 64, grinding continues solely along the X axis toward arc segment 66 at the preset feedrate Fr(p). After arc segment 66 is ground by rotating spindle 30 at the calculated feedrate Fr(c), the workpiece will be advanced back to starting point 61 along the X and Y axes. In this manner, the entire perimeter of shape 60 shown in FIG. 3 will be ground at a constant, preset feedrate Fr(p). The rotation of spindle 30 about the C-axis at the calculated feedrate Fr(c) to grind the arc segments ensures that an overall uniform surface speed will be maintained at the cutting edge 29.

Cutting of shape 70 shown in FIG. 4 proceeds in much the same manner, with arc segments 72, 74, 76, and 78 ground by rotating the C-axis of spindle 30 at the computed feedrate Fr(c). Commencing at point 71, linear movement along the X and/or Y axis occurs at the preset feedrate Fr(p).

Turning now to FIG. 2, the system for providing arc segment grinding while maintaining uniform surface speed at the cutting edge is shown diagrammatically. The heart of the system is a computer numerical controler ("CNC") 46. A machine operator inputs, via operator control panel 36, a preset feedrate Fr(p) using feedrate input means 48. The operator also inputs to CNC 46 the radius "r" from the center axis of spindle 30 to the cutting edge 29 of grinding wheel 28. The radius information is entered through radius input means 50. The operator computes the radius "r" by physically measuring the distance from the center axis of spindle 30 to cutting edge 29. As shown in FIG. 2, the operator can adjust the radius by offsetting the receptacle portion 27 of tool holder 26 from base portion 25 thereof. Base portion 25 of tool holder 26 is mounted to spindle 30.

Once the feedrate Fr(p) and radius "r" information is entered, CNC 46 computes, as a function of the entered values, a rotational speed Fr(c) for spindle 30 to provide the desired uniform surface speed at the cutting edge 29 of tool 28 as the tool alternates between linear grinding along the X or Y axis and arc grinding along the C-axis. The computation is made in accordance with the formula:

$$Fr(c) = \frac{180 \, Fr(p)}{\pi r}$$

Figure 5:
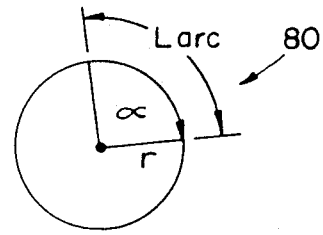
FIG. 5 is a sketch for use in deriving the relationship between the C-axis feedrate and the linear feedrate desired during a grinding or cutting operation.

The derivation of the above formula will be explained with reference to FIG. 5 of the drawings, which is a sketch of a circle 80 depicting an arc to be ground. For an arc segment of a given length $L_{arc}$, an angle $\alpha$ will be defined. Since the circumference of the circle can be expressed as $2\pi r$ and the entire circle encloses 360°, then $$L_{arc} = \frac{2 \pi r \alpha}{360}.$$

Grinding the distance $L_{arc}$ at the preset feedrate Fr(p) will require an amount of time $$T_{arc} = \frac{L_{arc}}{Fr(p)}.$$

The rate at which spindle 30 must be rotated about the C-axis in order to cover the angle $\alpha$ in time $T_{arc}$ can be computed from the formula $$Fr(c) = \frac{\alpha}{T_{arc}}.$$

Substituting for $T_{arc}$, it is seen that $$Fr(c) = \frac{\alpha \, Fr(p)}{L_{arc}}.$$

Substituting for $L_{arc}$, it can be seen that $$Fr(c) = \frac{180 \, Fr(p)}{\pi r}.$$

The computed feedrate for the C-axis, Fr(c) is expressed in units of "degrees per unit time".

After computing the C-axis feedrate Fr(c), CNC 46 outputs a signal satisfying the computed feedrate to motor servo control 52, which is a conventional motor drive unit. Motor servo control 52 drives motor 18 which is coupled to gear train 54 through shaft 19. Gear train 54 couples the rotary motion of motor 18 to spindle 30. Spindle 30, in turn, drives cutting or grinding tool 28 and an encoder 44. The output of encoder 44 is coupled to CNC 46 to provide a closed loop servo system responsible for rotating spindle 30 about the C-axis. Spindle rotation occurs at the computed C-axis feedrate Fr(c) for the arc length $L_{arc}$ required to cut or grind a desired shape.

In cutting or grinding a workpiece which has straight surfaces and adjoining arc segments at a constant feedrate without interruption, CNC 46 can be programmed to stop the movement of work holding table 32 in the X and/or Y direction concurrently with the commencement of rotation of spindle 30 about the C-axis. Similarly, CNC 46 can be programmed to stop rotation of spindle 30 about the C-axis concurrently with the commencement of movement of work table 32 along the X and/or Y axes. When C-axis rotation occurs at the computed rate Fr(c), the desired uniform surface speed at the cutting edge 29 of tool 28 will be acheived regardless of whether a straight line or an arc is being ground.

The present invention can also be used with other automated machine tools, including measuring machines and aspheric generators. In measuring machines, a probe is used to verify or measure physical dimensions on workpieces. Ultra-precise measuring machines are usually separate machine tools in and of themselves. Where somewhat less precision is acceptable, a jig grinder can be converted to a measuring machine by replacing the grinding tool with a suitable probe. The present invention can be used to provide automatic C-axis feedrate control for a probe which is part of either type of measuring machine.

Figure 6:
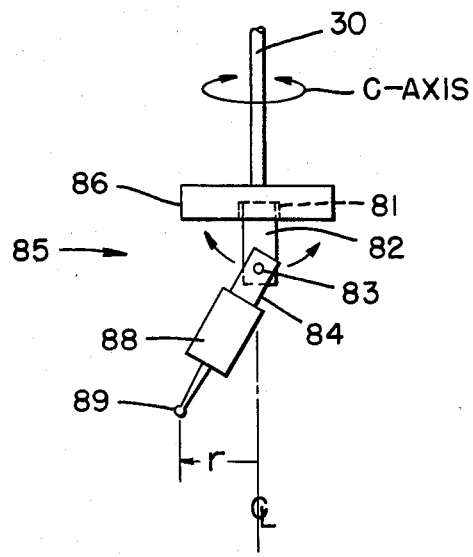
FIG. 6 is a diagram of an alternate embodiment of the tool and tool holder assembly shown in FIG. 2.

FIG. 6 illustrates the applicability of the present invention to a jig grinder used as a measuring machine. Shaft 30 is attached to a gear train 54 in exactly the same manner as shown in FIG. 2 for the jig grinder embodiment. In FIG. 6, a tool holder 86 carries a probe assembly 85 in a receptacle 81. Probe assembly 85 comprises a linkage arrangement 82, 84 joined by a pivot 83, which secures probe 88 to tool holder 86. Probe 88 includes a probe tip 89 ("working edge") for gauging portions of a workpiece to be measured.

The linkage arrangement 82, 84 enables probe 88 to be pivoted about pivot point 83 and secured with a suitable clamping arrangement (not shown), thereby enabling a machine operator to offset probe tip 89 from the center axis of spindle 30 to establish a radius "r". In gauging a workpiece along straight and arcuate paths, the feedrate of probe tip 89 can be maintained at a constant rate in the same manner described above for grinding at a constant feedrate.

The present invention can similarly be used on other machine tools which provide an axis of rotation that can rotate the tool or workpiece about an axis perpendicular to the contoured plane. For example, constant feedrate of a cutting tool or probe in an aspheric generator can be provided by offsetting the cutting tool or probe edge from a rotary table by a radius "r" and computing the rotational speed Fr(c) for the rotary table as set forth above.

In addition to the several embodiments of the present invention disclosed for purposes herein, it is to be understood that many variations and modifications could be made thereto. It is intended to cover all of those variations and modifications which fall within the scope of the present invention as defined by the appended claims.

What is claimed is:

1. A method for gauging straight surfaces and adjoining arcs at a constant feedrate without interruption comprising the steps of:
    coupling a probe for rotation about an axis of a machine tool;
    offsetting said probe from said axis to establish a radius "r" from the axis to the tip of said probe;
    mounting a workpiece to be gauged to a work holding fixture;
    moving said work holding fixture at a preset feedrate "Fr(p)" along a straight path to effect gauging of a straight surface on said workpiece by said probe;
    computing, as a function of the established radius "r" and said preset feedrate "Fr(p)", a rotational speed for rotating said probe about said axis to provide a uniform surface speed at the tip of said probe as said probe traverses said workpiece from a straight surface to an arc being gauged; and
    rotating said probe about said axis at the computed rotational speed when gauging an arc.

2. The method of claim 1 wherein said rotational speed "Fr(c)" is computed in accordance with the formula:

$$Fr(c) = \frac{180\, Fr(p)}{\pi\, r}.$$

3. The method of claim 1 comprising the further step of stopping the movement of said work holding fixture concurrently with the commencement of rotation of said probe.

4. The method of claim 1 comprising the further step of stopping the rotation of said probe concurrently with the commencement of movement of said work holding fixture.

5. The method of claim 4 comprising the further step of stopping the movement of said work holding fixture concurrently with the commencement of rotation of said probe.

6. A method for guiding a tool along straight surfaces and adjoining arcs at a constant feedrate without interruption comprising the steps of:
    coupling a tool for rotation about an axis of a machine tool;
    offsetting said tool from said axis to establish a radius "r" from the axis to a working edge of said tool;
    mounting a workpiece to be processed adjacent the working edge of said tool;
    moving said tool and workpiece relative to each other at a preset feedrate "Fr(p)" along a straight path to effect processing of said workpiece by said tool;
    computing, as a function of the established radius "r" and said preset feedrate "Fr(p)", a rotational speed Fr(c) substantially according to the formula $$Fr(c) = \frac{180\, Fr(p)}{\pi\, r}$$

for rotating said tool about said axis to provide a uniform surface speed at the working edge of said tool as said tool traverses said workpiece from a straight path to an arcuate path; and
    rotating said tool about the axis at the computed rotational speed to move the tool along the arcuate path.

7. A machine tool comprising: first and second generally perpendicular axes;
    a tool mounted for rotation about said first axis;
    means for offsetting the tool from said first axis to establish a radius "r" from the first axis to a working edge of said tool;
    means for providing relative linear movement between said tool and workpiece along said second axis at a preset feedrate "Fr(p)";
    means for computing, as a function of the established radius "r" and said preset feedrate "Fr(p)", a rotational speed "Fr(c)" substantially in accordance with the formula $$Fr(c) = \frac{180\, Fr(p)}{\pi\, r}$$

for rotation of said tool about said first axis to provide a uniform surface speed at the working edge of said tool as the relative movement between said tool and a workpiece progresses linearly along said second axis and arcuately about said first axis; and means for rotating said tool about said first axis to traverse an arc at said computed rotational speed "Fr(c)".

8. The machine tool of claim 7 wherein said tool is a measuring probe.

9. The machine tool of claim 7 wherein said first axis is the C-axis and the second axis comprises the X/or Y axis of the machine tool.

* * * * *